(12) United States Patent
Dong et al.

(10) Patent No.: US 12,258,063 B2
(45) Date of Patent: Mar. 25, 2025

(54) BELT ASSEMBLY AND ARRANGEMENT FOR VEHICLE

(71) Applicant: Yanfeng International Automotive Technology Co., Ltd., Shanghai (CN)

(72) Inventors: Xubin Dong, Shanghai (CN); Xiaobo Zhang, Shanghai (CN); Lei Yang, Shanghai (CN); Thomas Rossbach, Shanghai (CN)

(73) Assignee: Yanfeng International Automotive Technology Co., Ltd., Shanghai (CN)

( * ) Notice: Subject to any disclaimer, the term of this patent is extended or adjusted under 35 U.S.C. 154(b) by 323 days.

(21) Appl. No.: 17/874,606

(22) Filed: Jul. 27, 2022

(65) Prior Publication Data

US 2023/0347966 A1 Nov. 2, 2023

(30) Foreign Application Priority Data

Apr. 27, 2022 (CN) .......................... 202210453253.9

(51) Int. Cl.
| | |
|---|---|
| *B62D 1/08* | (2006.01) |
| *B60R 21/203* | (2006.01) |
| *B60R 21/2338* | (2011.01) |
| *F16H 7/24* | (2006.01) |
| *B60R 21/20* | (2011.01) |
| *B60R 21/23* | (2006.01) |

(52) U.S. Cl.
CPC .............. *B62D 1/08* (2013.01); *B60R 21/203* (2013.01); *B60R 21/2338* (2013.01); *F16H 7/24* (2013.01); *B60R 2021/23386* (2013.01)

(58) Field of Classification Search
CPC ... B62D 1/08; B62D 1/06; B62D 1/10; B62D 1/04; B60R 21/203; B60R 21/2338; B60R 2021/23386; B60R 13/02; B60R 13/0243; F16H 7/24; B60J 5/0487; B60N 2/64; B60Y 2410/123; B60Y 2410/125
See application file for complete search history.

(56) References Cited

U.S. PATENT DOCUMENTS

| | | | | |
|---|---|---|---|---|
| 4,245,856 A | * | 1/1981 | Ziv | .......................... B60R 22/04 |
| | | | | 280/802 |
| 4,966,393 A | * | 10/1990 | Tokugawa | .......... A44B 11/2553 |
| | | | | 280/801.1 |

(Continued)

FOREIGN PATENT DOCUMENTS

DE 102020104300 A1 8/2021

OTHER PUBLICATIONS

Extended European Search Report issued on Jun. 2, 2023 for corresponding EP application No. 22192225.5 (8 pages).

*Primary Examiner* — David M Upchurch
(74) *Attorney, Agent, or Firm* — Merchant & Gould P.C.

(57) ABSTRACT

A belt assembly for a vehicle and an arrangement for a vehicle including the belt assembly are disclosed. The belt assembly comprises a belt body having at least two ends, at least one of which is loop-free, wherein the belt body is fixedly provided with a first attachment at the at least one end, wherein the first attachment forms a step with respect to at least one side surface of the belt body at the respective end of the belt body, wherein the first attachment, together with the belt body, form a first mounting end of the belt assembly. The belt assembly may have improved appearance and improved accuracy.

21 Claims, 5 Drawing Sheets

(56) References Cited

U.S. PATENT DOCUMENTS

| | | | | |
|---|---|---|---|---|
| 5,022,316 A * | 6/1991 | Hellwig | ............... | B65B 27/083 |
| | | | | 206/83.5 |
| 5,046,197 A * | 9/1991 | Chernuchin | ............ | A41F 9/002 |
| | | | | 2/322 |
| 5,193,254 A * | 3/1993 | Geisinger | ............... | E05B 75/00 |
| | | | | 24/484 |
| 5,658,012 A * | 8/1997 | Villarreal | ............... | B60R 22/16 |
| | | | | 280/805 |
| 6,202,957 B1 * | 3/2001 | Bannert | ................. | B60R 22/34 |
| | | | | 242/376 |
| 10,155,461 B2 * | 12/2018 | Titz | ........................ | B60N 2/508 |
| 2005/0067826 A1 * | 3/2005 | McFalls | ............. | B60R 21/0155 |
| | | | | 280/801.1 |
| 2006/0225939 A1 * | 10/2006 | Burghardt | ............. | B60R 22/023 |
| | | | | 180/268 |
| 2009/0091115 A1 * | 4/2009 | Bell | ........................ | B60R 22/20 |
| | | | | 280/801.2 |
| 2019/0210554 A1 * | 7/2019 | Williams | ............. | B60R 21/239 |
| 2019/0359039 A1 * | 11/2019 | Osorio | ................... | B60J 5/0487 |
| 2021/0122326 A1 * | 4/2021 | Schneider | ............... | B60R 22/16 |

* cited by examiner

BELT ASSEMBLY AND ARRANGEMENT FOR VEHICLE

CROSS-REFERENCE TO RELATED APPLICATION(S)

This application claims priority benefit of Serial No. 202210453253.9, filed Apr. 27, 2022 in China, and which application is incorporated herein by reference. To the extent appropriate, a claim of priority is made to the above-disclosed application.

TECHNICAL FIELD

The present application relates to a belt assembly for a vehicle and an arrangement for a vehicle including the belt assembly.

BACKGROUND OF INVENTION

FIG. 1 is a perspective view of a part of a belt assembly 1 known in practice. The belt assembly 1 has a flexible belt body 11, which is folded back at an end and is sewed by at least one, especially at least two, sewing thread 13 to form a loop. An attachment, such as a metal pin 12, is wound by the belt body and is held in the loop. This known belt assembly has low accuracy. The length of the belt assembly isn't easily controllable. The belt assembly may need a large space. In addition, in this belt assembly, the sewing thread is exposed, which isn't beneficial to the appearance of the belt assembly. When the belt body has a pattern, the pattern may also be negatively affected by the sewing thread.

The patent literature CN214355853U discloses a belt assembly for a vehicle steering wheel, wherein a belt body is folded back and is sewed by a sewing thread to form a loop at each of its ends, and a sheet-like metal attachment is wound by the belt body and is held in the loop. This belt assembly may have the defects mentioned in the last paragraph.

SUMMARY OF INVENTIVE

An object of the present invention is to provide an improved belt assembly for a vehicle and an arrangement for a vehicle including the belt assembly, wherein at least one of the defects of the belt assemblies in the prior art can be overcome by the belt assembly according to the present invention.

A first aspect of the present invention relates to a belt assembly for a vehicle, wherein the belt assembly comprises a belt body having at least two ends, at least one of which is loop-free, wherein the belt body is fixedly provided with a first attachment on the at least one end, wherein the first attachment forms a step with respect to at least one side surface of the belt body at the respective end of the belt body, wherein the first attachment together with the respective end of the belt body forms a first mounting end of the belt assembly.

In the belt assembly according to the present invention, at the respective end of the belt assembly, it isn't necessary that the belt body is folded back, is sewn by a sewing thread and forms a loop as did in the prior art. On the contrary, the first attachment may be in planar contact with and be fixedly connected with the flat respective end of the belt body without relative movement. The belt assembly according to the present invention may have an improved appearance at its first mounting end. The belt assembly according to the present invention may have improved accuracy. For example, its length may be determined accurately.

In some embodiments, the first attachment may form the step with respect to each of the two opposite side surfaces of the belt body at the respective end of the belt body.

In some embodiments, the first attachment may form a single step with respect to exact one of the two opposite side surfaces of the belt body at the respective end of the belt body, and doesn't form a step with respect to the other side surface of the belt body.

In some embodiments, the first attachment may be an overmolded part surrounding the respective end of the belt body, wherein the overmolded part is integrally connected with the belt body. The first attachment may be cost-effectively formed by an injection molding process. In the producing process, the respective end of the belt body may be put into an injection mold.

In some embodiments, the first attachment may include:
a first attachment part provided on a first side surface of the belt body at the respective end of the belt body and forming a first step with respect to the first side surface; and
a second attachment part provided on a second side surface of the belt body opposite to the first side surface at the respective end of the belt body and forming a second step with respect to the second side surface;
wherein the first attachment part, the respective end of the belt body and the second attachment part form a sandwich structure and are fixedly connected with each other.

In some embodiments, the first and the second attachment part of the first attachment may engage with each other, wherein one of the first and the second attachment part has an engagement groove, and the other of the and the second attachment part has an engagement protrusion, wherein the engagement protrusion passes through the belt body and is inserted into the engagement groove in a press-fit manner.

In some embodiments, the first and the second attachment part of the first attachment may be fixed to each other by a fastener which passes through the belt body. The fastener may be, for example, a bolt, a rivet, a pin, an expansion plug or the like.

In some embodiments, one of the first and the second attachment part of the first attachment may have a threaded sleeve which passes through the belt body, and the other of the first and the second attachment part of the first attachment may have a recess for receiving the threaded sleeve, wherein the fastener is a screw bolt screwed into the threaded sleeve from the other attachment part.

In some embodiments, at least one of the first and the second attachment part of the first attachment may be bonded with the belt body.

In some embodiments, the first and the second attachment part of the first attachment may be bonded and/or welded to each other.

In some embodiments, the belt body may extend linearly and have two opposite ends.

In some embodiments, the other end of the at least two ends of the belt body may be loop-free, wherein the belt body may be fixedly provided with a second attachment, which together with the respective other end of the belt body forms a second mounting end of the belt assembly. Optionally, the second mounting end may have a mounting hole.

In some embodiments, the second attachment may form a step with respect to at least one side surface of the belt body at the respective other end of the belt body. For example, it may form a single step with respect to exact one side surface of the belt body, or a step with respect to each of the two side surfaces of the belt body.

In some embodiments, the second attachment may be an overmolded part surrounding the respective other end of the belt body, wherein the overmolded part is integrally connected with the belt body.

In some embodiments, the second attachment may include:
- a first attachment part provided on a first side surface of the belt body at the respective other end of the belt body; and
- a second attachment part provided on a second side surface of the belt body opposite to the first side surface at the respective other end of the belt body;

wherein the first attachment part, the respective other end of the belt body and the second attachment part form a sandwich structure and are fixedly connected with each other.

In some embodiments, the first and the second attachment part of the second attachment may engage with each other, wherein one of the first and the second attachment part of the second attachment has an engagement groove, and the other of the first and the second attachment part of the second attachment has an engagement protrusion, which passes through the belt body and is inserted into the engagement groove in a press-fit manner.

In some embodiments, the first and the second attachment part of the second attachment may be fixed to each other by a fastener which passes through the belt body.

In some embodiments, one of the first and second attachment parts of the second attachment may have a threaded sleeve that passes through the belt body, and the other of the first and second attachment parts of the second attachment may have a recess for receiving the threaded sleeve, wherein the fastener is a screw bolt screwed into the threaded sleeve from the other attachment part.

In some embodiments, at least one of the first and the second attachment part of the second attachment may be bonded with the belt body.

In some embodiments, the first end of the belt body may be loop-free, and is fixedly provided with the first attachment, and together with the first attachment forms the first mounting end; and the second end of the belt body may be loop-free, and is fixedly provided with the second attachment, and together with the second attachment forms the second mounting end.

In some embodiments, each of the ends of the belt body may be fixedly provided with the first attachment, and together with the attachment form the first mounting end.

In some embodiments, the mounting hole may be an elliptical hole, wherein a long axis of the elliptical hole runs parallel to a longitudinal direction of the belt body.

In some embodiments, the belt assembly may be a functional member or a decorative member for a vehicle.

In some embodiments, the belt assembly may be configured for a backrest of a vehicle seat, wherein a backrest frame may be provided with two receiving members for connection with the two mounting ends of the belt assembly.

In some embodiments, the belt assembly may be configured for a side door of a vehicle, wherein a sheet metal part of the side door may be provided with two receiving members for connection with the two mounting ends of the belt assembly.

In some embodiments, the belt assembly may be a decorative member for a steering wheel of a vehicle.

In some embodiments, the other end of the at least two ends may not be provided with an attachment, and doesn't form a mounting end. For example, the other end may be provided with a decoration part made of fabric, which may be suspended in the vehicle by the belt assembly.

In some embodiments, the other end of the at least two ends may be provided with a different mounting end from the first mounting end, wherein the different mounting end has the same contour as the first mounting end.

In some embodiments, the other end of the at least two ends may be provided with a different mounting end from the first mounting end, wherein the different mounting end has a different contour from the first mounting end. In some embodiments, the attachment and thus the corresponding mounting end may have two opposite flat side surfaces.

In some embodiments, the attachment may be a block body, which may be in one piece or comprise multiple pieces, wherein the block body may have an extension area and a thickness, wherein a thickness direction of the block body corresponds to a thickness direction of belt body. Optionally, the block body may be an integral injection molded part or a cast metal part.

In some embodiments, the mounting hole of the second mounting end may be a non-circular hole.

A second aspect of the present invention relates to an arrangement for a vehicle, comprising:
- a first receiving member having a receiving groove;
- a belt assembly according to any one of embodiments of the present invention, wherein the belt assembly is inserted into the receiving groove with its first mounting end; and
- a blocking member that can be inserted into the receiving groove after the belt assembly is inserted into the receiving groove with its first mounting end;

wherein the blocking member holds at least a position of the first mounting end of the belt assembly in the receiving groove, and at least one of the first receiving member and the blocking member has at least one stop which cooperates with the at least one step of the first mounting end of the belt assembly to hold the first mounting end of the belt assembly in a pull-out direction of the first mounting end from the receiving groove.

In other words, the blocking member can ensure the positioning of the first mounting end in the receiving groove in two dimensions perpendicular to the pull-out direction of the first mounting end, and the at least one stop provided by the first receiving member and/or the blocking member can position the first mounting end in the pull-out direction.

In some embodiments, the first receiving member may have a first stop which cooperates with a first step of the first mounting end on a first side surface of the belt body.

In some embodiments, the blocking member may have a second stop which cooperates with a second step of the first mounting end on a second side surface of the belt body opposite to the first side surface.

In some embodiments, the arrangement may include a second receiving member having a receiving hole, wherein the belt assembly is mounted to the second receiving member by a fastener with its second mounting end, wherein the fastener is inserted through the mounting hole into the receiving hole.

In some embodiments, the fasteners may be a screw bolt, a pin, an expansion plug or the like.

In some embodiments, the receiving hole may be a threaded hole.

In some embodiments, the second receiving member may have a plate-shaped portion with opposite first and second side surfaces, wherein the plate-shaped portion has a mounting surface on its first side surface.

In some embodiments, the receiving hole runs through the plate-shaped portion, and preferably, extends into a cylindrical portion protruding from the second side surface of the plate-shaped portion.

In some embodiments, in a tensioned state of the belt body, the second mounting end of the belt assembly can rest on the mounting surface, and a surface of the second mounting end facing the second receiving member forms an included angle with the mounting surface, wherein the included angle is changeable by operating the fastener to adjust the tension of the belt body.

In some embodiments, the second receiving member may have a guide portion bent from the plate-shaped portion toward the first side surface thereof, wherein the guide portion is configured to guide the belt body in a tensioned state.

In some embodiments, the guide portion may have a guide groove with a guide edge extending laterally and two guide legs extending from the guide edge, the guide edge being configured to guide one of the two side surfaces of the belt body in a tensioned state, and each guide leg being configured to guide one of the longitudinal edges of the belt body in the tensioned state.

In some embodiments, the second receiving member may have a mounting portion bent from the plate-shaped portion toward the second side surface thereof, wherein the mounting portion is configured to mount the second receiving member.

In some embodiments, the first receiving member and/or the second receiving member and/or the blocking member may be made of metal, plastic or composite materials.

In some embodiments, the arrangement may be a steering wheel for a vehicle.

In some embodiments, the first receiving member may be associated with a rim of the steering wheel, and/or the second receiving member may be associated with a hub in the center of the steering wheel.

The invention also includes a motor vehicle comprising a belt assembly for a vehicle according to any one of the embodiments of the invention or an arrangement for a vehicle according to any one of the embodiments of the invention.

In some embodiments, the vehicle may be a passenger car, such as a vehicle which is operable solely by an internal combustion engine, a hybrid vehicle or a purely electric vehicle (BEV).

The above-mentioned technical features, the technical features to be mentioned below and the technical features only shown in the drawings can be arbitrarily combined with each other, as long as the combined technical features are not mutually contradictory. All possible feature combinations are technical contents explicitly recorded in the application. Any one of the sub-features in the same one expression can be applied independently and isn't inevitably applied together with the other sub-features.

BRIEF DESCRIPTION OF DRAWINGS

Now, with reference to the schematic drawings, the present invention will be explained in more detail by means of exemplary embodiments.

EMBODIMENTS

Figure 1:
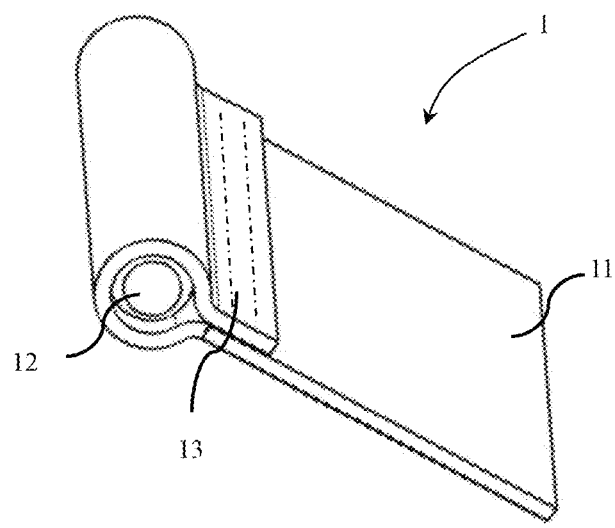
FIG. 1 is a partial perspective view of a known belt assembly.
Figure 2:
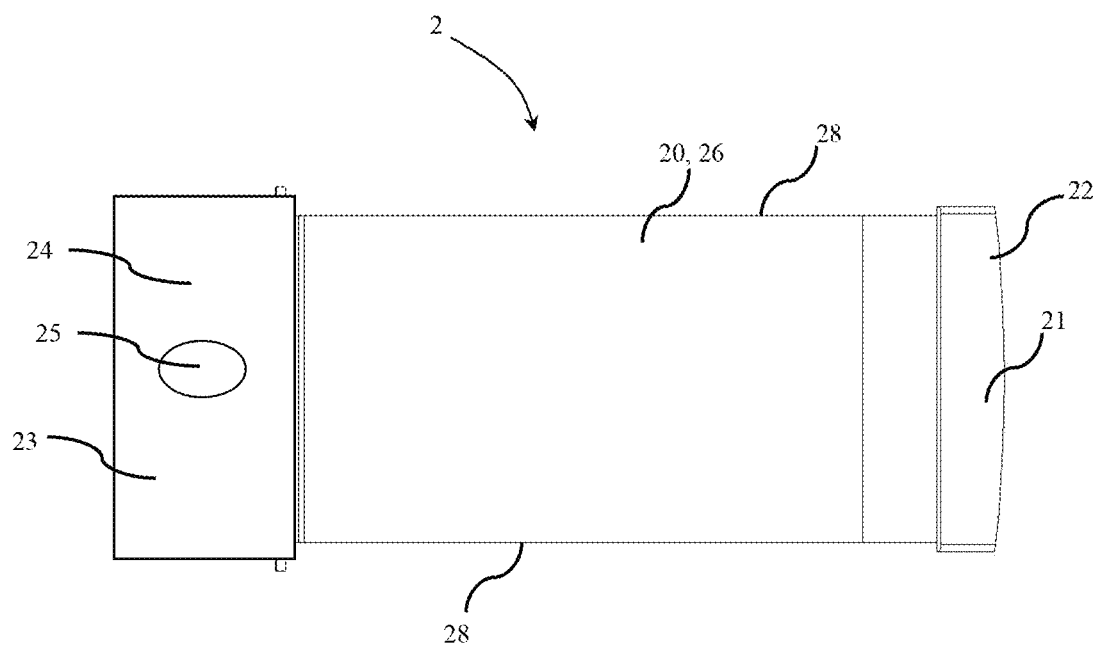
FIG. 2 is a plan view of a belt assembly according to a first embodiment of the present invention.

Exemplary embodiments are described in more detail with reference to the accompanying drawings. In the drawings, the same reference signs may indicate the identical or functionally identical components. In the description of an embodiment with reference to any one of the figures, references to the other figures may be made. If a component and/or a reference sign mentioned in the description of the one figure don't appear in the one figure, references to the identical or functionally identical component and/or the corresponding reference sign in the other figures may be made.

First, with reference to FIGS. 2 to 6, a belt assembly 2 for a vehicle according to a first embodiment of the present invention and a steering wheel 6 according to an embodiment of the present invention are described. The steering wheel is an exemplary arrangement for a vehicle including the belt assembly 2. The vehicle (not shown) may be a motor vehicle, especially a passenger car.

The belt assembly 2 includes a flexible belt body 20 that extends linearly, has a substantially constant width, and has two opposite ends. The belt body 20 is fixedly provided with an attachment 21, 23 at each of the two ends. The attachments 21, 23 are integrally connected with the respective ends of the belt body 20 in the form of overmoulded parts by a plastic injection molding process, and thus form a first mounting end 22 and a second mounting end 24 of the belt assembly 2. The second mounting end 24 has a mounting hole 25. The mounting hole 25 may be formed as an elliptical through hole, wherein a long axis of the elliptical through hole may run substantially parallel to a longitudinal direction of the belt body 20. In some embodiments, the same or similar material as a safety belt of a vehicle may be used as the material of the belt body 20. In some embodiments, the material of the belt body 20 may have no elasticity substantially, or may have predetermined elasticity.

Figure 4:
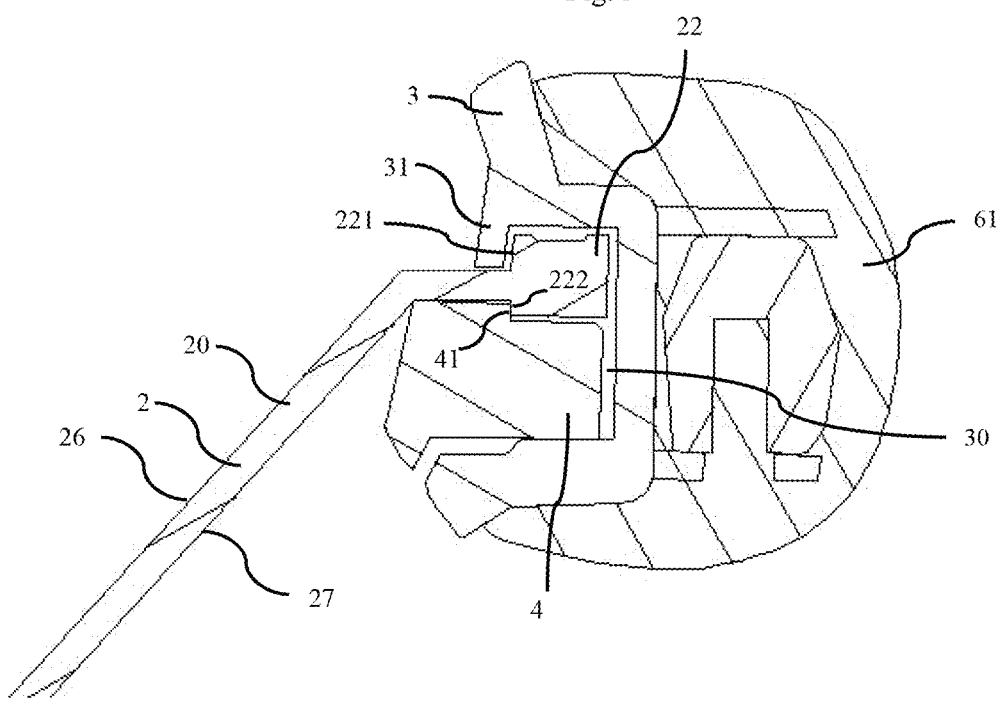
FIGS. 4 and 5 are partial sectional views of the steering wheel of FIG. 3 along a longitudinal center line of the belt assembly in regions of two mounting ends of the belt assembly.
Figure 5:
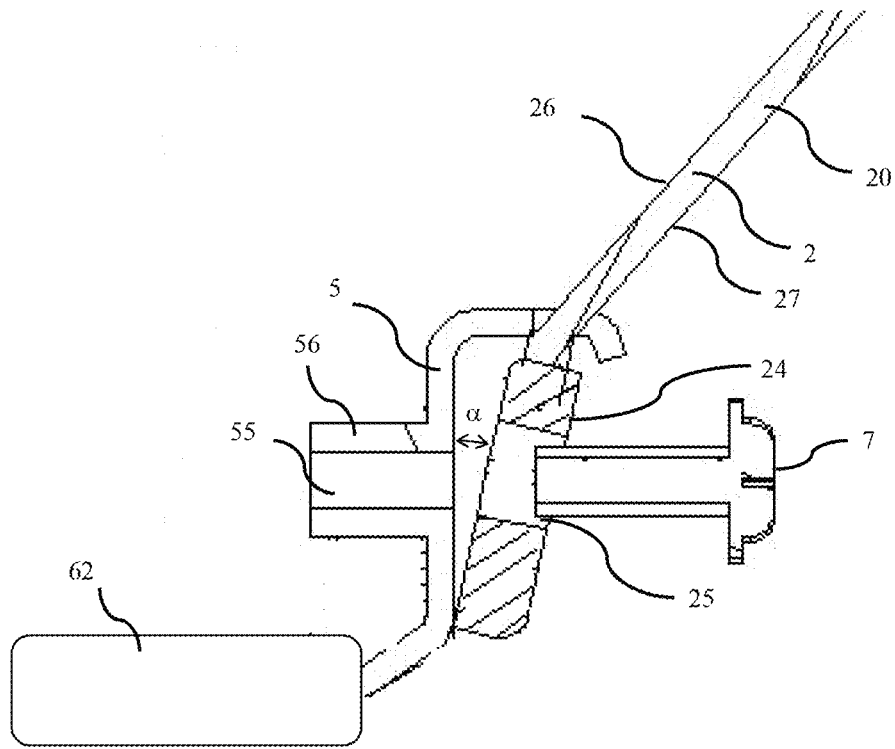

Structural details of the two mounting ends 22, 24 of the belt assembly 2 may be seen in FIGS. 4 and 5, wherein FIG. 4 is a partial longitudinal sectional view along a longitudinal center line of the belt assembly 2 in a region of the first mounting end 22 of the belt assembly 2 in an exemplary application of the belt assembly 2 in a steering wheel 6, and FIG. 5 is a partial longitudinal sectional view along the longitudinal center line of the belt assembly 2 in a region of the second mounting end 24 of the belt assembly 2 in the exemplary application of the steering wheel 6.

As shown in FIG. 4, at the first mounting end 22 of the belt assembly 2, the first attachment 21 in the form of an overmolded part can form a step with respect to each of the two side surfaces of the belt body 20 at a first end of the belt body 20. Similarly, as shown in FIG. 5, at the second mounting end 24 of the belt assembly 2, the second attachment 23 in the form of an overmolded part can form a step with respect to each of the two side surfaces of the belt body 20 at a second end of the belt body 20 opposite to the first end. It can be understood that the steps at the second mounting end 24 are optional. In an embodiment not shown, the second mounting end 24 may have no step.

In a variant not shown, instead of the overmolded part, at the first end of the belt body 20, the first attachment 21 is integrally connected with the belt body 20 in the form of an injection molded part (a side injection molded part) on exact one side surface of the belt body 20, and therefore, according to this variant, the first mounting end 22 of the belt assembly 2 has exact one step on exact one side surface (either the first side surface 26 or the second side surface 27) of the belt body 20.

Figure 3:
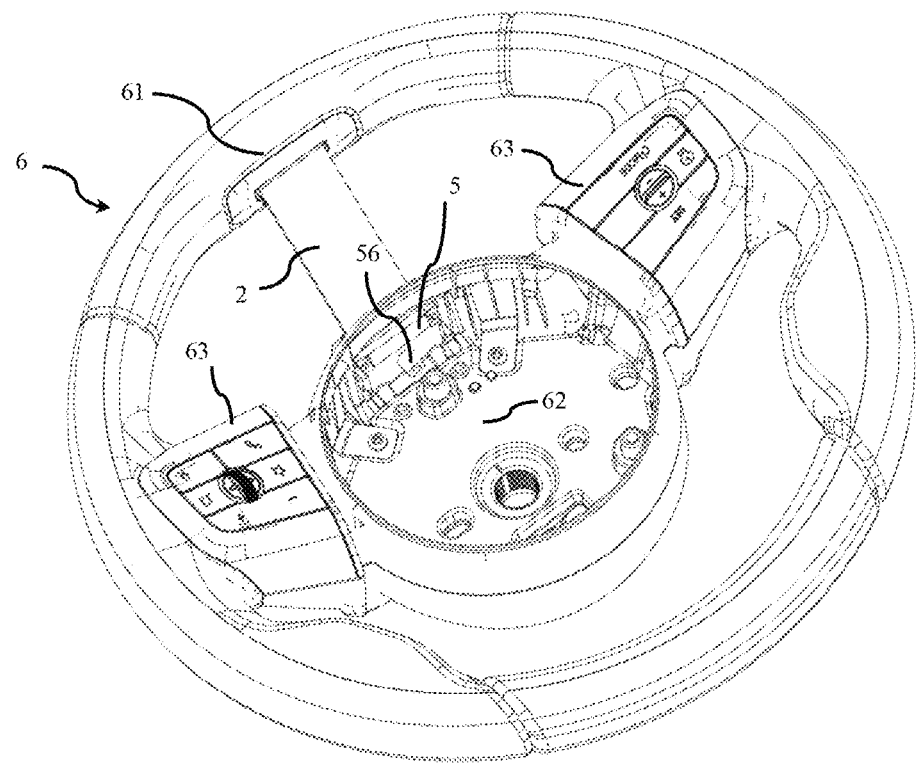
FIG. 3 is a perspective view of a steering wheel including the belt assembly of FIG. 2 according to an embodiment of the present invention.

In the embodiment shown in FIG. 3, the first mounting end 22 and the second mounting end 24 have different contours. In a variant not shown, a modified first mounting end may have the same contour as the second mounting end 24 shown in FIG. 3. Similar to the first mounting end 22 of FIG. 3, the modified first mounting end has no mounting hole.

In another variant not shown, the belt body 20 may be provided with the first attachment 21 as shown in FIG. 3 at its first end and thus the belt assembly has the first mounting end; and the belt body 20 may not be provided with the second attachment 23 as shown in FIG. 3 at its second end and therefore the belt assembly doesn't have the second mounting end. Here, the second end of the belt body 20 may be configured as a free end, or may be provided with a decoration part, such as a decoration part made of fabric.

FIG. 3 is a perspective view of an arrangement including the belt assembly 2 according to an embodiment of the present invention, which provides a steering wheel 6 for a vehicle, wherein the belt assembly 2 forms a decorative member of the steering wheel 6. The steering wheel 6 has a rim 61 and a central hub 62, which are connected by two spokes 63, wherein various operating elements may be provided on the spokes 63. In the central hub 62, a structural unit (not shown) may be mounted, which may include an airbag for a driver and a horn activating device for a vehicle horn.

As shown in FIGS. 3 and 4, the belt assembly 2 may be detachably mounted to the rim 61 of the steering wheel 6 with its first mounting end 22. To this end, the rim 61 of the steering wheel 6 may be provided with a first receiving member 3. The first receiving member 3 may be an integral part of a skeleton of the rim 61, or may be an injection molded part on the skeleton, or may be mounted to the rim 61 as a separate component. The first receiving member 3 may have a receiving groove 30 and a protrusion extending from a groove wall of the receiving groove 30, which protrusion may form a first stop 31. The belt assembly 2 can be inserted into the receiving groove 30 of the first receiving member 3 with its first mounting end 22. The first stop 31 can cooperate with a first step 221 of the first mounting end 22 on a first side surface 26 of the belt body 20. After the belt assembly 2 is inserted into the receiving groove 30 of the first receiving member 3 with its first mounting end 22, a blocking member 4 can be inserted into the receiving groove 30. The blocking member 4 can hold a position of the first mounting end 22 of the belt assembly 2 in the receiving groove 30, so that the first mounting end 22 can't move in the receiving groove 30 in a direction perpendicular to a pull-out direction of the first mounting end 22 from the receiving groove 30. The blocking member 4 may have a second stop 41, which may cooperate with a second step 222 of the first mounting end 22 on a second side surface 27 of the belt body 20 opposite to the first side surface 26. The second stop 41 may be configured as a step of the blocking member 4. The first mounting end 22 can't be pulled out of the receiving groove 30 through the cooperation of the two stops 221, 222 and the two steps 31, 41 of the first mounting end 22, and thus can be firmly held in the receiving groove 30. The blocking member 4 may be held in the rim 61 of the steering wheel 6 in any suitable way. For example, it may be detachably held in the rim 61 by a screw connection or a snap-fit connection. When the belt assembly 2 needs to be replaced, the blocking member 4 may be detached from the rim 61, and then the first mounting end 22 may be removed from the receiving groove 30.

Figure 6:
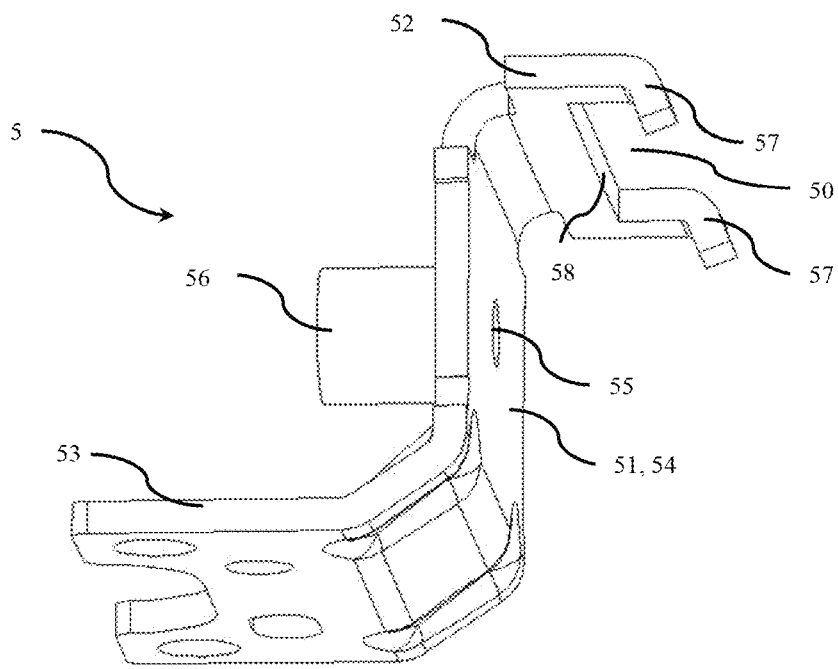
FIG. 6 is a perspective view of a second receiving member of the arrangement of FIG. 3.

As shown in FIGS. 3 and 5, the belt assembly 2 can be detachably mounted to the hub 62 in the center of the steering wheel 6 with its second mounting end 24. To this end, the hub 62 may be provided with a second receiving member 5. FIG. 5 shows a connection structure of the second mounting end 24 of the belt assembly 2 in the hub 62 in the center of the steering wheel 6. FIG. 6 is a perspective view of an exemplary second receiving member 5.

The second receiving member 5 may have a plate-like portion 51 with opposite first and second side surfaces, wherein the plate-like portion 51 has a mounting surface 54 on its first side surface. A receiving hole 55 penetrates the plate-like portion 51 and extends into a cylindrical portion 56 protruding from the second side surface of the plate-like portion 51. When the second mounting end 24 is mounted to the second receiving member 5 with a screw bolt 7, the receiving hole 55 may be a threaded hole, wherein the screw bolt 7 is screwed into the receiving hole 55 through the mounting hole 25 of the second mounting end 24.

The second receiving member 5 may have a guide portion 52 bent from the plate-like portion 51 toward the first side surface thereof, wherein the guide portion 52 is configured to guide the belt body 20 in a tensioned state. The guide portion 52 may have a guide groove 50, which may have a guide edge 58 extending laterally and two guide legs 57 extending from the guide edge 58. The guide edge 58 is configured to guide the upper first side surface 26 of the belt body 20 in the tensioned state, so that the first side surface 26 of the belt body 20 can slide along the guide edge 58. Each guide leg 57 is configured to guide one of the two longitudinal edges 28 of the belt body 20 in the tensioned state. The visible part of the belt body 20 can keep its position and orientation by means of the guide portion 52 guiding the belt body 20.

In the tensioned state of the belt body 20, the second mounting end 24 of the belt assembly 2 can rest on the flat mounting surface 54 of the plate-like portion 51 with its end edge. A flat side surface of the second mounting end 24 facing the second receiving member 5 may form an included angle with the mounting surface 54. By operating the screw bolt 7, the included angle can be changed to adjust the tension of the belt body 20. For example, when the performance of the belt assembly 2 deteriorates during its use and thus it becomes slack, the screw bolt 7 can be appropriately screwed into the receiving hole 55, so that the belt body 20 can be kept in a predetermined tension degree, wherein the included angle is reduced correspondingly. The screw bolt 7 may be self-lockable. Alternatively or additionally, the screw bolt 7 may be provided with anti-loosening means.

The second receiving member 5 may have a mounting portion 53 bent from the plate-like portion 51 toward the second side surface thereof, wherein the mounting portion 53 is configured to mount the second receiving member 5 to the hub 62 in the center of the steering wheel 6. To this end, the mounting portion 53 may have a plurality of mounting holes, and may be firmly fixed with the hub 62 by a plurality of fasteners.

Figure 7:
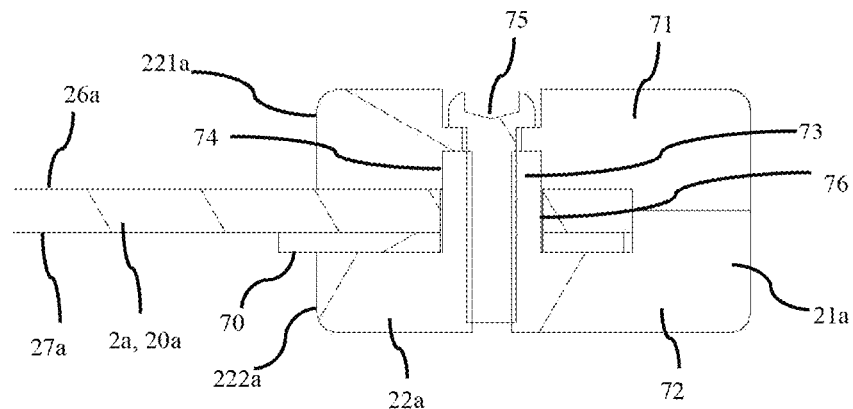
FIG. 7 is a partial longitudinal sectional view of a belt assembly according to a second embodiment of the present invention in a region of a first mounting end.

FIG. 7 is a longitudinal sectional view of a belt assembly 2a according to a second embodiment of the present invention in a region of a first mounting end 22a. The first attachment 21a is attached to a first end of a belt body 20a under forming the first mounting end 22a. The first attachment 21a includes a first attachment portion 71 and a second attachment portion 72. The first attachment portion 71 is provided on a first side surface 26a of the belt body 20a at the first end of the belt body 20a and forms a first step 221a with respect to the first side surface 26a. The second attachment portion 72 is provided on a second side surface 27a of the belt body 20a opposite to the first side surface 26a at the first end of the belt body 20a and forms a second step 222a with respect to the second side surface 27a. The first attachment part 71, the first end of the belt body 20a and the second attachment part 72 form a sandwich structure and are fixedly connected to each other. To this end, the first attachment part 71 and the second attachment part 72 may be fixed to each other by a fastener 75. The second attachment part 72 may have a threaded sleeve 73, and the first attachment part 71 may have a recess 74 for receiving the threaded sleeve 73. The threaded sleeve 73 passes through an opening 76 of the belt body 20a and is inserted into the recess 74. In the embodiment shown in FIG. 7, the fastener 75 is a screw bolt which is screwed into the threaded sleeve 73 from the first attachment portion 71. Additionally, in a producing process of the belt assembly 2a, before the first end of the belt body 20a rests on the second attachment part 72, an adhesive agent may be applied to the first end of the belt body 20a, and the cured adhesive agent may form an adhesive layer 70 to bond the belt body 20a and the second attachment part 72. The fixed connection between the first attachment 21a and the first end of the belt body 20a may be realized by one fastener 75 or a plurality of fasteners 75. For example, in a width direction of the belt body 20a, one fastener 75 may be centrally disposed at the first mounting end 22a, or two fasteners 75 may be disposed side by side.

The belt assembly 2a may have a second mounting end (not shown) opposite to the first mounting end 22a, which may have a connection structure similar to the first mounting end 22a, and which may have the same or similar contour and mounting hole 25 as the second mounting end 24 of the belt assembly 2 according to the first embodiment.

Figure 8:
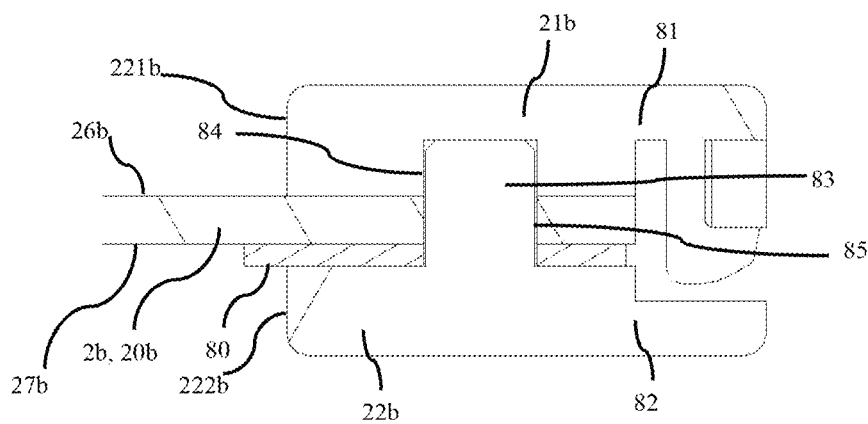
FIG. 8 is a partial longitudinal sectional view of a belt assembly according to a third embodiment of the present invention in a region of a first mounting end.

FIG. 8 is a longitudinal sectional view of a belt assembly 2b according to a third embodiment of the present invention in a region of a first mounting end 22b. The first attachment 21b is attached to a first end of the belt body 20b under forming the first mounting end 22b. The first attachment 21b includes a first attachment portion 81 and a second attachment portion 82. The first attachment part 81 is provided on a first side surface 26b of the belt body 20b at the first end of the belt body 20b and forms a first step 221b with respect to the first side surface 26b. The second attachment part 82 is provided on a second side surface 27b of the belt body 20b opposite to the first side surface 26b at the first end of the belt body 20b and forms a second step 222b with respect to the second side surface 27b. The first attachment part 81, the first end of the belt body 20b and the second attachment part 82 form a sandwich structure and are fixedly connected to each other. To this end, the first attachment part 81 and the second attachment part 82 may engage with each other. The first attachment part 81 may have an engagement groove 84, and the second attachment part may have an engagement protrusion 83, which is inserted into the engagement groove 84 through an opening 85 of the belt body 20b in a press-fit manner. Additionally, in a producing process of the belt assembly 2b, before the first end of the belt body 20b rests on the second attachment part 82, an adhesive agent may be applied to the first end of the belt body 20b, and the cured adhesive agent may form an adhesive layer 80 to bond the belt body 20b with the second attachment part 82. The fixed connection between the first attachment 21b and the first end of the belt body 20b can be realized by a single engagement structure. For example, in a width direction of the belt body 20b, one engagement structure may be centrally arranged at the first mounting end 22b, or two engagement structures may be arranged side by side.

The belt assembly 2b may have a second mounting end (not shown) opposite to the first mounting end 22b, which may have a connection structure similar to the first mounting end 22b, and which may have the same or similar contour and mounting hole 25 as the second mounting end 24 of the belt assembly 2 according to the first embodiment.

Figure 9:
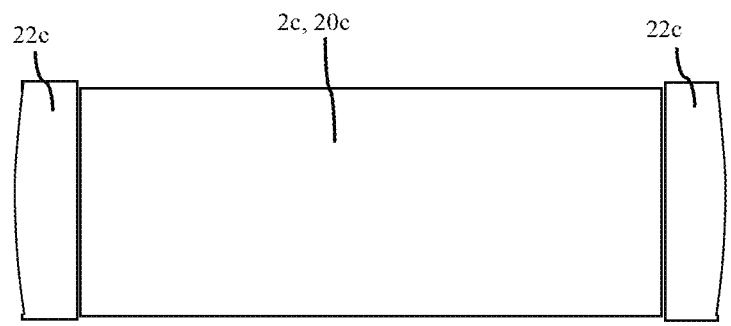
FIG. 9 is a plan view of a belt assembly according to a fourth embodiment of the present invention.

FIG. 9 is a plan view of a belt assembly 2c according to a fourth embodiment of the present invention. The belt assembly 2c includes a belt body 20c extending linearly and two first mounting ends 22c. The two first mounting ends 22c may be configured identically or similarly. For example, they may be configured identically or similarly to any one of the aforementioned first mounting ends 22, 22a, 22b, respectively. For example, the two first mounting ends 22c may be respectively configured identically to the first mounting end 22. Alternatively, one of the first mounting ends 22c may be configured identically to the first mounting end 22, and the other first mounting end 22c may be configured identically to the first mounting end 22a. In an alternative embodiment not shown, the two first mounting ends 22c may have different contours.

In an exemplary application of the belt assembly 2c, each of the two first mounting ends 22c may be detachably mounted to a receiving member of the vehicle body by a blocking member, wherein the receiving member and the blocking member may be the same as or similar to the receiving member 3 and the blocking member 4 in the embodiment shown in FIGS. 3 and 4.

Figure 10:
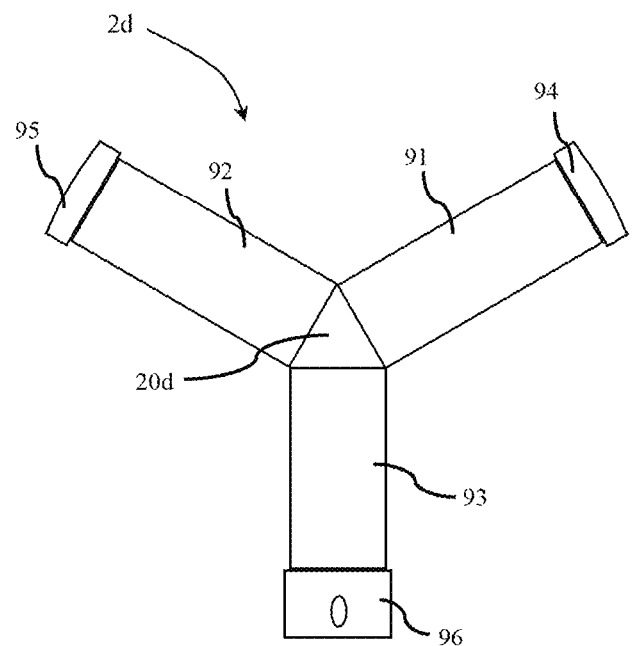
FIG. 10 is a plan view of a belt assembly according to a fifth embodiment of the present invention.

FIG. 10 is a plan view of a belt assembly 2d according to a fifth embodiment of the present invention. The belt assembly 2d includes a belt body 20d having three arms 91, 92, 93, which each have a mounting end 94, 95, 96. Among these mounting ends, the mounting ends 94, 95, as two first mounting ends, may be the same as or similar to any one of the aforementioned first mounting ends 22, 22a, 22b, and the mounting end 96, as a second mounting end, may be the same or similar to the aforementioned second mounting end 24 or the second mounting end mentioned in the description of the belt assembly 2a, 2b of the second or the third embodiment. The belt assembly 2d may be applied as a decorative member for a steering wheel of a vehicle, wherein the two mounting ends 94 and 95 may be associated with a rim of the steering wheel, and the mounting end 96 may be associated with a hub in the center of the steering wheel.

Figure 11:
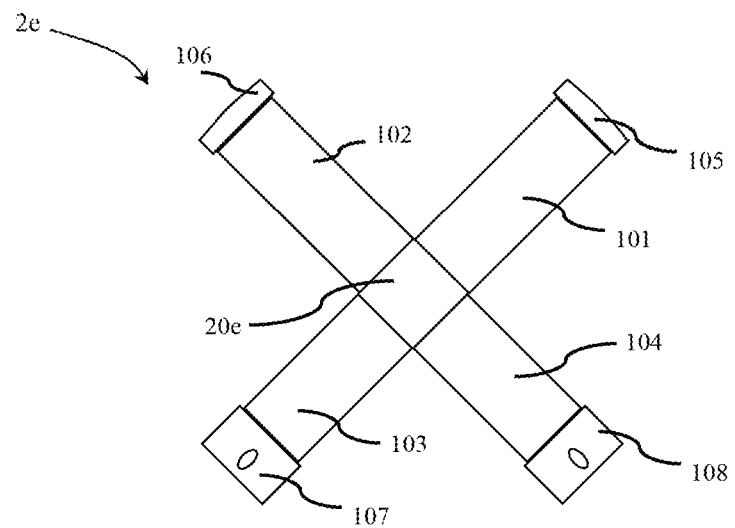
FIG. 11 is a plan view of a belt assembly according to a sixth embodiment of the present invention.

FIG. 11 is a plan view of a belt assembly 2e according to a sixth embodiment of the present invention. The belt assembly 2e includes a belt body 20e having four arms 101, 102, 103, 104, which each have a mounting end 105, 106, 107, 108. Among these mounting ends, the mounting ends 105, 106, as two first mounting ends, may be the same as or similar to any one of the aforementioned first mounting ends 22, 22a, 22b, and the mounting ends 107, 108, as two second mounting ends, may be the same as or similar to the aforementioned second mounting end 24 or that as mentioned in the description of the belt assembly 2a, 2b of the second or the third embodiment. The belt assembly 2e may also be applied as a decorative member for a steering wheel of a vehicle, wherein the mounting ends 105 and 106 may be associated with a rim of the steering wheel, and the mounting ends 107 and 108 may be associated with a hub in the center of the steering wheel or spokes of the steering wheel.

It will be understood that, the terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprise" and "include" (and variants thereof), when used in this specification, specify the presence of stated operations, elements, and/or components, but do not preclude the presence or addition of one or more other operations, elements, components, and/or groups thereof. As used herein, the term "and/or" includes any and all combinations of one or more of the associated listed items. Like reference numbers signify like elements throughout the description of the figures.

The thicknesses of elements in the drawings may be exaggerated for the sake of clarity. Further, it will be understood that when an element is referred to as being "on," "coupled to" or "connected to" another element, the element may be formed directly on, coupled to or connected to the other element, or there may be one or more intervening elements therebetween. In contrast, terms such as "directly on," "directly coupled to" and "directly connected to," when used herein, indicate that no intervening elements are present. Other words used to describe the relationship between elements should be interpreted in a like fashion (i.e., "between" versus "directly between", "attached" versus "directly attached," "adjacent" versus "directly adjacent", etc.).

Terms such as "top," "bottom," "upper," "lower," "above," "below," and the like are used herein to describe the relationship of one element, layer or region to another element, layer or region as illustrated in the figures. It will be understood that these terms are intended to encompass different orientations of the device in addition to the orientation depicted in the figures.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive concept.

It will also be appreciated that all example embodiments disclosed herein can be combined in any way.

Finally, it is to be noted that, the above-described embodiments are merely for understanding the present invention but not constitute a limit on the protection scope of the present invention. For those skilled in the art, modifications may be made on the basis of the above-described embodiments, and these modifications do not depart from the protection scope of the present invention.

The invention claimed is:

1. A belt assembly for a vehicle, comprising a belt body having at least two ends, wherein at least a first one of the at least two ends is loop-free, wherein the belt body is fixedly provided with a first attachment at the at least first end, the first attachment forming a step with respect to at least one side surface of the belt body at the first end of the belt body, the first attachment, together with the first end of the belt body, forming a first mounting end of the belt assembly, wherein the belt assembly is a decorative member for a steering wheel of a vehicle.

2. The belt assembly for vehicles as recited in claim 1, wherein the first attachment forms a step with respect to each of two opposite side surfaces of the belt body at the first end of the belt body.

3. The belt assembly for vehicles as recited in claim 1, wherein the first attachment is an overmolded part surrounding the first end of the belt body, which is integrally connected with the belt body.

4. A belt assembly for a vehicle, comprising a belt body having at least two ends, wherein at least a first one of the at least two ends is loop-free, wherein the belt body is fixedly provided with a first attachment at the at least first end, the first attachment forming a step with respect to at least one side surface of the belt body at the first end of the belt body, the first attachment, together with the first end of the belt body, forming a first mounting end of the belt assembly, wherein the first attachment comprises:
   a first attachment part provided on a first side surface of the belt body at the first end of the belt body and forming a first step with respect to the first side surface; and
   a second attachment part provided on a second side surface of the belt body opposite to the first side surface at the first end of the belt body and forming a second step with respect to the second side surface;
   wherein the first attachment part, the first end of the belt body and the second attachment part form a sandwich structure and are fixedly connected with each other.

5. The belt assembly for a vehicle as recited in claim 4, wherein the first and the second attachment part of the first attachment engage with each other, wherein one of the first and the second attachment part of the first attachment has an engagement groove, and the other of the first and the second attachment part of the first attachment has an engagement protrusion, which passes through the belt body and is inserted into the engagement groove in a press-fit manner.

6. The belt assembly for vehicles as recited in claim 4, wherein the first and the second attachment part of the first attachment are fixed to each other by a fastener which passes through the belt body.

7. The belt assembly for vehicles as recited in claim 6, wherein one of the first and the second attachment part of the first attachment has a threaded sleeve which passes through the belt body, and the other of the first and the second attachment part of the first attachment has a recess for receiving the threaded sleeve, wherein the fastener is a screw bolt screwed into the threaded sleeve from the other attachment part.

8. The belt assembly for vehicles as recited in claim 1, wherein the belt body extends linearly and has two opposite ends.

9. A belt assembly for a vehicle, comprising a belt body having at least two ends, wherein at least a first one of the at least two ends is loop-free, wherein the belt body is fixedly provided with a first attachment at the at least first end, the first attachment forming a step with respect to at least one side surface of the belt body at the first end of the belt body, the first attachment, together with the first end of the belt body, forming a first mounting end of the belt assembly, wherein a second one of at least two ends of the belt body is loop-free, and the belt body is fixedly provided with a second attachment at the second end, wherein the second attachment, together with the second end of the belt body, forms a second mounting end of the belt assembly, wherein the second mounting end has a mounting hole.

10. The belt assembly for a vehicle as recited in claim 9, wherein the second attachment forms a step with respect to at least one side surface of the belt body at the second end of the belt body,
wherein the second attachment is an overmolded part surrounding the second end of the belt body, which is integrally connected with the belt body.

11. The belt assembly for a vehicle as recited in claim 9, wherein the belt body extends linearly and has two opposite ends,
wherein a first end of the belt body is loop-free, and is fixedly provided with the first attachment, and forms the first mounting end together with the first attachment; and
wherein the second end of the belt body is loop-free, is fixedly with the second attachment, and forms the second mounting end together with the second attachment.

12. The belt assembly for a vehicle as recited in claim 9, wherein the mounting hole is an elliptical hole, wherein a long axis of the elliptical hole runs parallel to a longitudinal direction of the belt body.

13. An arrangement for a vehicle, wherein the arrangement comprises:
a first receiving member having a receiving groove;
a belt assembly, comprising a belt body having at least two ends, wherein at least a first one of the at least two ends is loop-free, wherein the belt body is fixedly provided with a first attachment at the at least one first end, the first attachment forming a step with respect to at least one side surface of the belt body at the respective first end of the belt body, the first attachment, together with the respective first end of the belt body, forming a first mounting end of the belt assembly, wherein the belt assembly is mounted to the receiving groove with the first mounting end; and
a blocking member mounted to the receiving groove after the belt assembly is mounted to the receiving groove with the first mounting end;
wherein the blocking member holds at least a position of the first mounting end of the belt assembly in the receiving groove, and at least one of the first receiving member and the blocking member has at least one stop which cooperates with the at least one step of the first mounting end of the belt body to hold the first mounting end of the belt assembly in a pull-out direction of the first mounting end from the receiving groove.

14. The arrangement for a vehicle as recited in claim 13, wherein,
the first receiving member has a first stop which cooperates with a first step of the first mounting end on a first side surface of the belt body; and
the blocking member has a second stop which cooperates with a second step of the first mounting end on a second side surface of the belt body opposite to the first side surface.

15. The arrangement for a vehicle as recited in claim 13, wherein the arrangement comprises a second receiving member having a receiving hole;
wherein a second one of at least two ends of the belt body is loop-free, and the belt body is fixedly provided with a second attachment at the second end, wherein the second attachment, together with the second end of the belt body, forms a second mounting end of the belt assembly, wherein the second mounting end has a mounting hole, and the belt assembly is mounted to the second receiving member by a fastener with the second mounting end;
wherein the fastener is inserted into the receiving hole through the mounting hole.

16. The arrangement for a vehicle as recited in claim 15, wherein the fastener is a screw bolt and the receiving hole is a threaded hole.

17. The arrangement for a vehicle as recited in claim 15, wherein the second receiving member has a plate-shaped portion with opposite first and second side surfaces, wherein the plate-shaped portion has a mounting surface on the first side surface, wherein a receiving hole penetrates through the plate-shaped portion and extends into a cylindrical portion protruding from the second side surface of the plate-shaped portion;
wherein in a tensioned state of the belt body, the second mounting end of the belt assembly rests on the mounting surface, and a surface of the second mounting end facing the second receiving member forms an included angle with the mounting surface, wherein the included angle can be changed by operating the fastener to adjust the tension of the belt body.

18. The arrangement for a vehicle as recited in claim 17, wherein the second receiving member has a guide portion bent from the plate-shaped portion toward the first side surface thereof, wherein the guide portion is configured to guide the belt body in a tensioned state.

19. The arrangement for a vehicle as recited in claim 18, wherein the guide portion has a guide groove with a guide edge extending laterally and two guide legs protruding from the guide edge, wherein the guide edge is configured to guide one of two side surfaces of the belt body in the tensioned state, and each guide leg is configured to guide one of longitudinal edges of the belt body in the tensioned state.

20. The arrangement for a vehicle as recited in claim 17, wherein the second receiving member has a mounting portion bent from the plate-shaped portion toward the second side surface thereof, wherein the mounting portion is configured to mount the second receiving member.

21. The arrangement for a vehicle as recited in claim 15, wherein the arrangement is a steering wheel for a vehicle, wherein the first receiving member is associated with a rim of the steering wheel, and the second receiving member is associated with a hub in the center of the steering wheel.

* * * * *